United States Patent
Shao et al.

(10) Patent No.: US 10,949,764 B2
(45) Date of Patent: Mar. 16, 2021

(54) AUTOMATIC MODEL REFRESHMENT BASED ON DEGREE OF MODEL DEGRADATION

(71) Applicant: INTERNATIONAL BUSINESS MACHINES CORPORATION, Armonk, NY (US)

(72) Inventors: Yi Shao, Xian (CN); Liang Wang, Xian (CN); Jing Xu, Xian (CN); Jing James Xu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 15/692,963

(22) Filed: Aug. 31, 2017

(65) Prior Publication Data

US 2019/0065979 A1 Feb. 28, 2019

(51) Int. Cl.
*G06N 7/00* (2006.01)
*G06N 5/02* (2006.01)
*G06N 20/00* (2019.01)

(52) U.S. Cl.
CPC ............. *G06N 7/005* (2013.01); *G06N 5/022* (2013.01); *G06N 20/00* (2019.01)

(58) Field of Classification Search
CPC ......... G06N 7/005; G06N 20/00; G06N 5/022
See application file for complete search history.

(56) References Cited

U.S. PATENT DOCUMENTS

| | | | |
|---|---|---|---|
| 9,239,986 B2 | 1/2016 | Lin et al. | |
| 2003/0023593 A1 | 1/2003 | Schmidt | |
| 2007/0220034 A1 | 9/2007 | Iyer et al. | |
| 2015/0278706 A1 | 10/2015 | Shivashankar et al. | |
| 2015/0302318 A1 | 10/2015 | Chen et al. | |
| 2016/0350671 A1 | 12/2016 | Morris, II et al. | |
| 2016/0364647 A1 | 12/2016 | Achin et al. | |
| 2017/0124263 A1 | 5/2017 | Crafts, Jr. et al. | |
| 2017/0162194 A1* | 6/2017 | Nesta | G10L 25/30 |
| 2018/0060759 A1* | 3/2018 | Chu | G06N 20/00 |
| 2018/0197087 A1* | 7/2018 | Luo | G06N 20/00 |
| 2018/0285691 A1* | 10/2018 | Grindstaff | G06K 9/6256 |
| 2019/0378044 A1* | 12/2019 | Jeffery | G06N 5/04 |
| 2020/0026988 A1* | 1/2020 | Guo | G06N 3/084 |
| 2020/0111100 A1* | 4/2020 | Adjaoute | G06Q 20/4016 |

OTHER PUBLICATIONS

Mell et al., "The NIST Definition of Cloud Computing", National Institute of Standards and Technology, Special Publication 800-145, Sep. 2011, pp. 1-7.

\* cited by examiner

*Primary Examiner* — Alan Chen
(74) *Attorney, Agent, or Firm* — Anthony M. Pallone (57) ABSTRACT

According to an embodiment, a method, computer system, and computer program product for managing data is provided. The present invention may include accumulating a plurality of predicted outputs according to a data accumulation rule. The plurality of predicted outputs is generated by a predictive model executed by a first system. The present invention may include evaluating, by a second system, an accuracy of the predictive model. Evaluating the accuracy of the predictive model may include determining a degree of difference between the plurality of predicted outputs and information generated during a development stage of the predictive model. The present invention may include determining whether the accuracy of the predictive model has declined by an amount which exceeds a pre-determined threshold. The present invention may include updating the predictive model.

17 Claims, 5 Drawing Sheets

AUTOMATIC MODEL REFRESHMENT BASED ON DEGREE OF MODEL DEGRADATION

BACKGROUND

The present invention relates, generally, to the field of predictive analytics, and more particularly to predictive model management.

Predictive analytics is the branch of advanced analytics used to make predictions about unknown future events. Predictive analytics may utilize techniques such as data mining, text analytics, statistics, predictive modeling, machine learning, and artificial intelligence to analyze current data in order to facilitate predictions about future events. Through the use of such techniques, predictive analytics may allow a business user to create predictive intelligence by uncovering patterns and relationships in both structured and unstructured data. Predictive intelligence may help an organization to identify future risks and opportunities.

SUMMARY

According to an embodiment, a method, computer system, and computer program product for managing data is provided. The present invention may include accumulating a plurality of predicted outputs according to a data accumulation rule. The plurality of predicted outputs is generated by a predictive model executed by a first system. The predictive model is loaded, from a predictive model store, on to the first system. The present invention may include evaluating, by a second system, an accuracy of the predictive model. Evaluating the accuracy of the predictive model may include determining a degree of difference between the plurality of predicted outputs and information generated during a development stage of the predictive model. In response to the determined degree of difference, the present invention may include determining whether the accuracy of the predictive model has declined by an amount which exceeds a pre-determined threshold value. Based on determining that the accuracy of the predictive model has declined by an amount which exceeds a pre-determined threshold value, the present invention may include updating the predictive model.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the example embodiments set forth herein. In the description, details of well-known features and techniques may be omitted to avoid unnecessarily obscuring the presented embodiments.

With the development of mobile, internet, and cloud computing, organizations are receiving and analyzing an increasing amount of data to gain insights concerning various business purposes. As a result of the analysis performed on the received data, organizations are building various predictive models to help them make better decisions, optimize their working procedures, manage customer relationships and so on. These predictive models are then deployed to various online systems to provide the acquired insights about the business. Such online systems usually contain several sub-systems or modules to collect data, train a predictive model, deploy the trained predictive model, and update the predictive model when model accuracy declines. Predictive model accuracy declination is a critical problem and the determination of when and how to update a deployed predictive model remains a challenge in real world analytic solutions. To handle this issue, traditional predictive analytic systems typically choose one of two options: 1) collect labeled data regularly to perform a traditional model evaluation process to detect the model accuracy deterioration; 2) collect labeled data regularly to train a new predictive model, which further will integrate with existing models to boost overall accuracy. Labeled data typically takes a set of unlabeled data and augments each piece of that unlabeled data with some sort of meaningful "tag," "label," or "class" that is somehow informative or desirable to know. However, in a continuously running online system, which provides predictive outputs to perform various businesses, these approaches are typically not feasible as: 1) they both need labeled data which is expensive to collect and requires extra efforts in organizing the collected labeled data; 2) predictive model accuracy declination cannot be detected in time; and 3) the predictive model cannot be refreshed as needed. As such, it may be advantageous to, among other things, implement a system capable of detecting predictive model accuracy declination utilizing model information and unlabeled data. Such a system may be more efficient and economic since it does not require labeled data. Furthermore, such a system may detect predictive model accuracy declination in real-time and may refresh a deteriorating predictive model only when necessary.

According to an embodiment, the present invention discloses an online analytic system which may include a repository that would hold various predictive models, at least one analytic server equipped with an analytic engine capable of using a predictive model to make predictions on input data, and at least one predictive model evaluator equipped with an accuracy analyzer capable of evaluating the accuracy of a predictive model using unlabeled, real-time input data. Furthermore, the present invention discloses a method of using the effect of a hypothesis test to analyze the accuracy of a predictive model. Rather than using labeled data, the proposed method may utilize predicted outputs in combination with predictive model information, generated at the model building stage (e.g. testing inputs and validation results), to evaluate the accuracy of the predictive model. Advantages of the present invention may include: predicted outputs of a specific predictive model may be collected and used for real-time evaluation of predictive model accuracy; unnecessary model rebuilding and comparison may be avoided as a specific predictive model may be updated on demand; and no dependency on labeled data.

The following described example embodiments provide a system, method, and program product to utilize unlabeled data for evaluation of predictive model accuracy and refreshment of the evaluated predictive model on-demand, if necessary.

Figure 1:
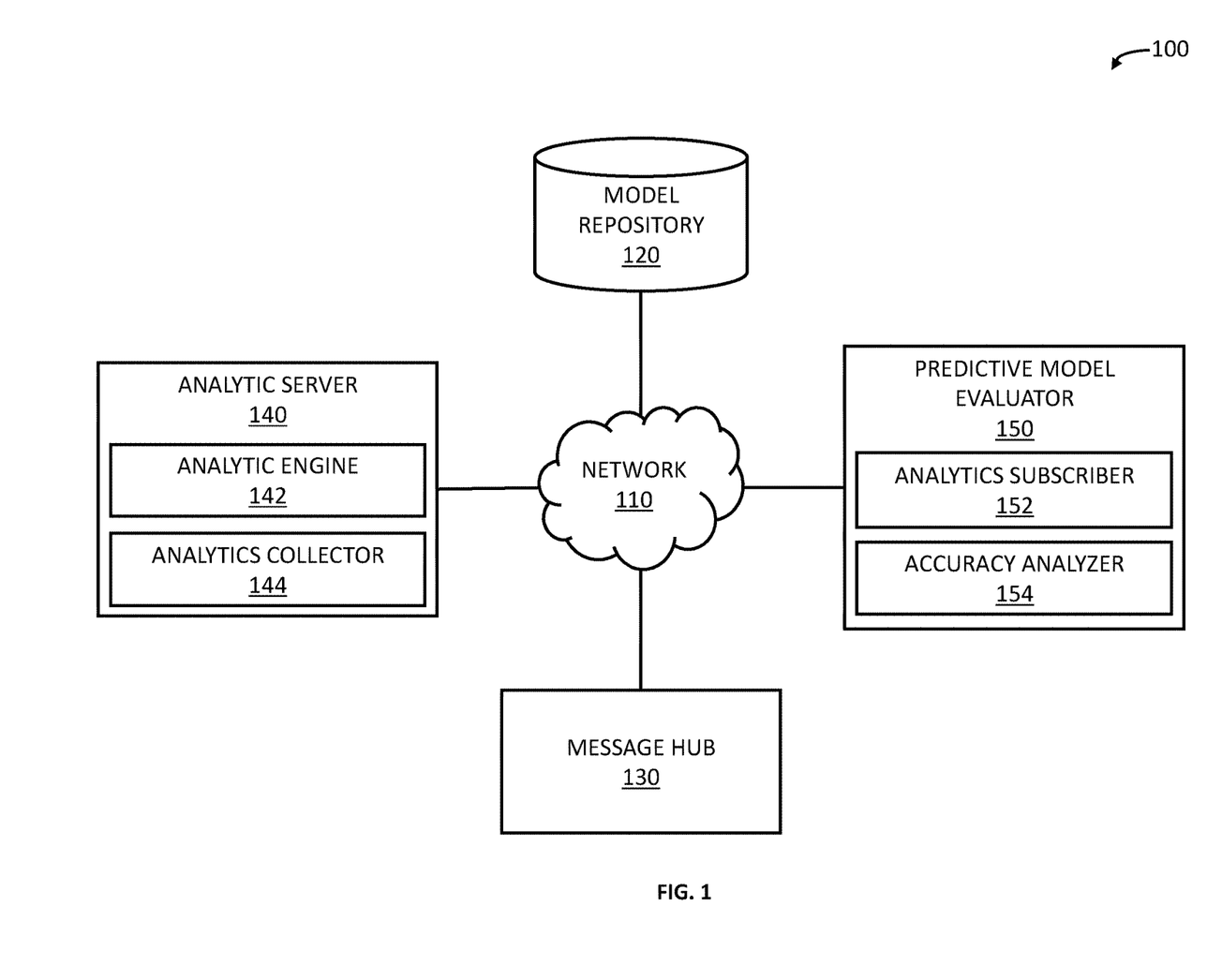
FIG. 1 is a block diagram illustrating a predictive model management system, in accordance with an embodiment of the present invention.

FIG. 1 is a functional block diagram illustrating predictive model management system 100, in accordance with an embodiment of the present invention. Predictive model management system 100 may be a distributed communication environment, including model repository 120, message hub 130, analytic server 140, and predictive model evaluator 150, all interconnected via network 110.

In various embodiments, network 110 may represent, for example, an intranet, a local area network (LAN), a wide area network (WAN) such as the Internet, or a combination of the two. Network 110 may include, for example, wired, wireless or fiber optic connections. In general, network 110 may be any combination of connections and protocols that will support communications between model repository 120, message hub 130, analytic server 140, and predictive model evaluator 150, in accordance with an embodiment of the present invention.

In an example embodiment, model repository 120 may be a laptop computer, tablet computer, netbook computer, personal computer (PC), desktop computer, a server, a blade server, a networked computer appliance, or any other networked programmable electronic device capable of storing data and capable of an exchange of data with other electronic devices, for example, through a network adapter, in accordance with an embodiment of the invention. In an example embodiment, model repository 120 may store various predictive models. Furthermore, for each stored predictive model, model repository 120 may also store information generated during the predictive model's development stage such as, for example, test inputs and validation results (e.g., predicted results, confidence, and propensities). The predictive models stored in model repository 120 may be developed according to known techniques for regression analysis. Moreover, the data stored within model repository 120 may be written in programming languages of common file formats. In an example embodiment, model repository may be accessible to predictive model management system 100 via network 110. Model repository 120 may be described generally with respect to FIG. 3 below.

In an example embodiment, message hub 130 may be a laptop computer, tablet computer, netbook computer, personal computer (PC), desktop computer, a networked computer appliance, a server, a blade server, or any other networked programmable electronic device capable of storing data and capable of an exchange of data with other electronic devices, for example, through a network adapter, in accordance with an embodiment of the invention. In an example embodiment, message hub 130 may store predictive model outputs received from analytics collector 144, described below. In an example embodiment, message hub 130 may be accessible to predictive model management system 100 via network 110. Message hub 130 may be described generally with respect to FIG. 3 below.

In an example embodiment, analytic server 140 may include analytic engine 142 and analytics collector 144. Analytic server 140 may be a desktop computer, a networked computer appliance, a server blade, a specialized computer server, or any other electronic device or computing system capable of hosting analytic engine 142 and analytics collector 144. Furthermore, in an example embodiment, analytic server 140 may be capable of sending and receiving data to and from other computing devices such as model repository 120 and message hub 130, via network 110. While analytic server 140 is shown as a single device, in other embodiments, analytic server 140 may be comprised of a cluster or plurality of computing devices, working together or working separately. Analytic server 140 may be described generally with respect to FIG. 3 below.

In an example embodiment, analytic engine 142 may be a software application or configuration in a software application capable of using a specific predictive model to make predictions on input data (i.e., assign labels for each input datum). In an example embodiment, analytic engine 142 may retrieve, via network 110, a predictive model from model repository 120 for execution on analytic server 140. In an example embodiment, analytic engine 142 may generate predicted outputs according to the retrieved predicted model.

In an example embodiment, analytics collector 144 may be a software application or configuration in a software application capable of collecting predicted outputs and propagating the collected predicted outputs to a message hub. In various embodiments, an analytics collector may be paired with each analytic engine. In an example embodiment, analytics collector 144 may be paired with analytic engine 142. In an example embodiment analytics collector 144 may monitor the activity of analytic engine 142 and collect the predicted outputs generated by analytic engine 142. Furthermore, in an example embodiment, analytics collector 144 may propagate/publish the predicted outputs, collected from analytic engine 142, to message hub 130, via network 110.

In an example embodiment, predictive model evaluator 150 may include analytics subscriber 152 and accuracy analyzer 154. Predictive model evaluator 150 may be a desktop computer, a networked computer appliance, a server blade, a specialized computer server, or any other electronic device or computing system capable of hosting analytics subscriber 152 and accuracy analyzer 154. Furthermore, in an example embodiment, predictive model evaluator 150 may be capable of sending and receiving data to and from other computing devices such as model repository 120 and message hub 130, via network 110. When a predictive model is executed on analytic server 140, predictive model evaluator 150 may be allocated and registered to message hub 130 for any predicted outputs generated according to the predictive model executed on analytic server 140 and published by analytics collector 144 to message hub 130. Through utilizing "publish-subscribe pattern" technology, an existing predictive analytic system (e.g., analytic server 140) may be decoupled from a model evaluation system (e.g., predictive model evaluator 150). Under such a "decoupled architecture", the predictive model evaluation process (e.g., accuracy analyzer 154) will not affect an existing predictive analytic system's throughput. While predictive model evaluator 150 is shown as a single device, in other embodiments, predictive model evaluator 150 may be comprised of a cluster or plurality of computing devices, working together or working separately. Predictive model evaluator 150 may be described generally with respect to FIG. 3 below.

In an example embodiment, analytics subscriber 152 may be a software application or configuration in a software application capable of receiving predictive outputs from a message hub (e.g. message hub 130). In an example embodiment, analytics subscriber 152 subscribes to the predicted outputs, generated by analytic engine 142 and published by analytics collector 144, located in message hub 130 and to which predictive model evaluator 150 is registered.

In an example embodiment, accuracy analyzer 154 may be a software application or configuration in a software application capable of accumulating the predictive outputs subscribed to by analytics subscriber 152. Rules governing how accuracy analyzer 154 collects and accumulates predicted outputs from analytics subscriber 152 may vary. For instance, an example rule may be to accumulate the predictive outputs of several prediction requests; another example rule may be to accumulate the predictive outputs for a period of time. Accuracy analyzer 154 may also evaluate the accuracy of the predictive model used to generate the accumulated predictive outputs by utilizing a hypothesis test to compare the accumulated predictive outputs against the information generated during the development stage of the predictive model and stored in model repository 120. Various known hypothesis testing (e.g. Kruskal-Wallis Test, Student's t-test) may be used for this evaluation. Moreover, in an example embodiment, the throughput of analytic engine 142 may be unaffected by accuracy analyzer 154 as the accumulated predictive outputs were subscribed to by analytics subscriber 152 and located on message hub 130, rather than directly accessed from analytic server 140. Furthermore, in an example embodiment, accuracy analyzer 154 may update/refresh the predictive model used to generate the predictive outputs if the comparison shows a significant difference. As time goes by, the accuracy of the deployed predictive model may decline due to changes and trends in the input data. As such, refreshment of the predictive model may be needed when accuracy declines significantly or when accuracy declination exceeds a pre-determined threshold value. The operations and functions of accuracy analyzer 154 are described in further detail below with regard to FIG. 2.

Figure 2:
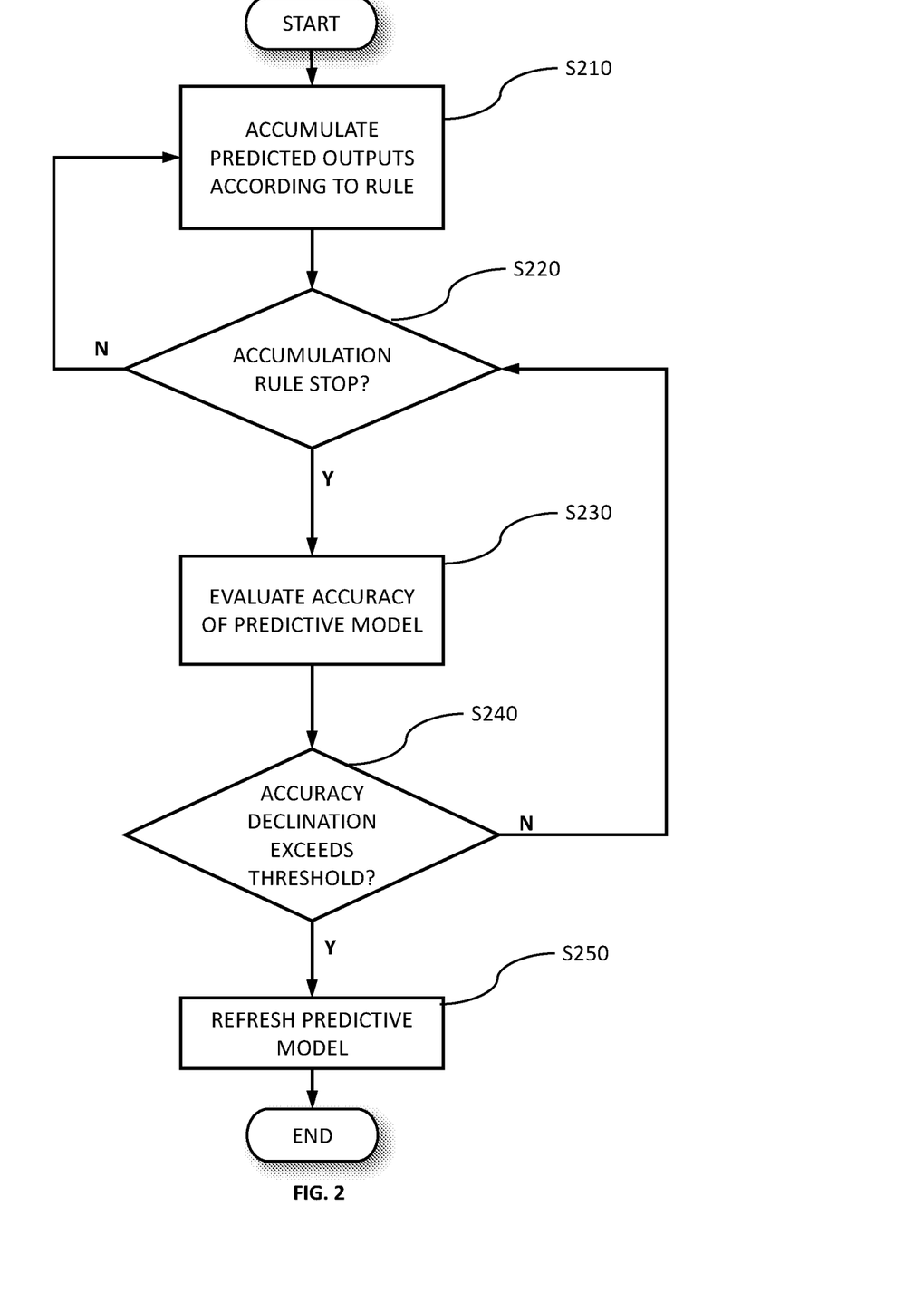
FIG. 2 is a flowchart illustrating the operations of the accuracy analyzer program of FIG. 1, in accordance with an embodiment of the invention.

FIG. 2 shows a flowchart illustrating the operations of accuracy analyzer 154 in accordance with an example embodiment of the invention. Referring to step S210, accuracy analyzer 154 may accumulate predicted outputs, received by analytics subscriber 152 from message hub 130 via network 110, according to some data accumulation rule. In an example embodiment, accuracy analyzer 154 may accumulate predicted outputs for a pre-determined period of time. Furthermore, in an example embodiment, the predicted outputs accumulated by accuracy analyzer 154 may have been generated according to a predictive model executed on analytic engine 142 and propagated, via network 110, to message hub 130 by analytics collector 144.

Referring to step S220, accuracy analyzer 154 may determine whether criteria for the data accumulation rule stop has been met. If criteria for the data accumulation rule stop has been met, accuracy analyzer 154 proceeds to step S230. If criteria for the data accumulation rule stop has not been met, accuracy analyzer 154 proceeds back to step S210. In an example embodiment, accuracy analyzer 154 determines that the criteria for the data accumulation rule stop has been met since accuracy analyzer 154 has accumulated predicted outputs for a pre-determined period of time.

Referring to step S230, accuracy analyzer 154 may evaluate the accuracy of the predictive model used to generate the predicted outputs accumulated in step S210. In order to evaluate the accuracy of the predictive model using only unlabeled data, accuracy analyzer 154 may utilize the effect of a hypothesis test to determine if the predictive outputs accumulated in step S210 are significantly different from the predictive model information generated during the development stage of the predictive model and accessed from model repository 120. According to an embodiment of the present invention, a predictive model represents characteristics of the dataset which was used to build the predictive model. Furthermore, these characteristics can be explored by looking at various information (e.g., as predicted results, confidence, propensities, etc.) collected during the development/validation process for the predictive model. Additionally, these characteristics may also be obtained from a new incoming unlabeled dataset (e.g., the dataset used to generate the predicted outputs accumulated in step S210). A hypothesis may be introduced that there are no significant differences between the predictive model information and the accumulated predictive outputs. In an example embodiment, accuracy analyzer 154 may access model repository 120 to retrieve information (e.g. testing inputs, predicted results, confidence, and propensities) generated during the development and validation stage of the predictive model executed by analytic engine 142 to generate the predictive outputs accumulated in step S210. Additionally, accuracy analyzer 154 may compare the information retrieved from model repository 120 to the predictive outputs accumulated in step 210 in order to determine a degree of difference, if any.

Referring to step S240, accuracy analyzer 154 may determine whether the accuracy of the predictive model used to generate the predictive outputs accumulated in step S210 has declined by an amount which exceeds a pre-determined threshold value. If the hypothesis introduced in step S230 is accepted, then accuracy analyzer 154 may determine that the predictive outputs accumulated in step S210 are similar to the predictive model information retrieved from model repository 120 (step S230). However, if the hypothesis is not accepted, accuracy analyzer 154 may determine that the accumulated predictive outputs differ from the predictive model information retrieved from model repository 120. The hypothesis may be accepted when the differences between the accumulated predictive outputs and the retrieved predictive model information is less than a pre-determined threshold value. Conversely, the hypothesis may be rejected when the differences between the accumulated predictive outputs and the retrieved predictive model information exceeds a pre-determined threshold value. The effect of an accepted hypothesis is that accuracy analyzer 154 determines that the accuracy of the predictive model used to generate the accumulated predictive outputs has not declined by an amount which exceeds a pre-determined threshold value and therefore proceeds to back to step S220. The effect of a rejected hypothesis is that accuracy analyzer 154 determines that the accuracy of the predictive model used to generate the accumulated predictive outputs has declined by an amount which exceeds a pre-determined threshold value and therefore proceeds to step S250. In an example embodiment, accuracy analyzer 154 determines that the accuracy of the predictive model used to generate the predictive outputs accumulated in step S210 has declined by an amount which exceeds a pre-determined threshold value.

Referring to step S250, accuracy analyzer 154 may update the predictive model, executed by analytic engine 142 to generate the predictive outputs accumulated in step S210, as a result of determining that the accuracy of the predictive model has declined by an amount which exceeds a pre-determined threshold value. In another embodiment, accuracy analyzer 154 may send notification of the need to update the predictive model upon determining that the accuracy of the predictive model has declined by an amount which exceeds a pre-determined threshold value.

It may be appreciated that FIG. 2 provides only an illustration of one implementation and does not imply any limitations with regard to how different embodiments may be implemented. Many modifications to the depicted environments may be made based on design and implementation requirements.

Figure 3:
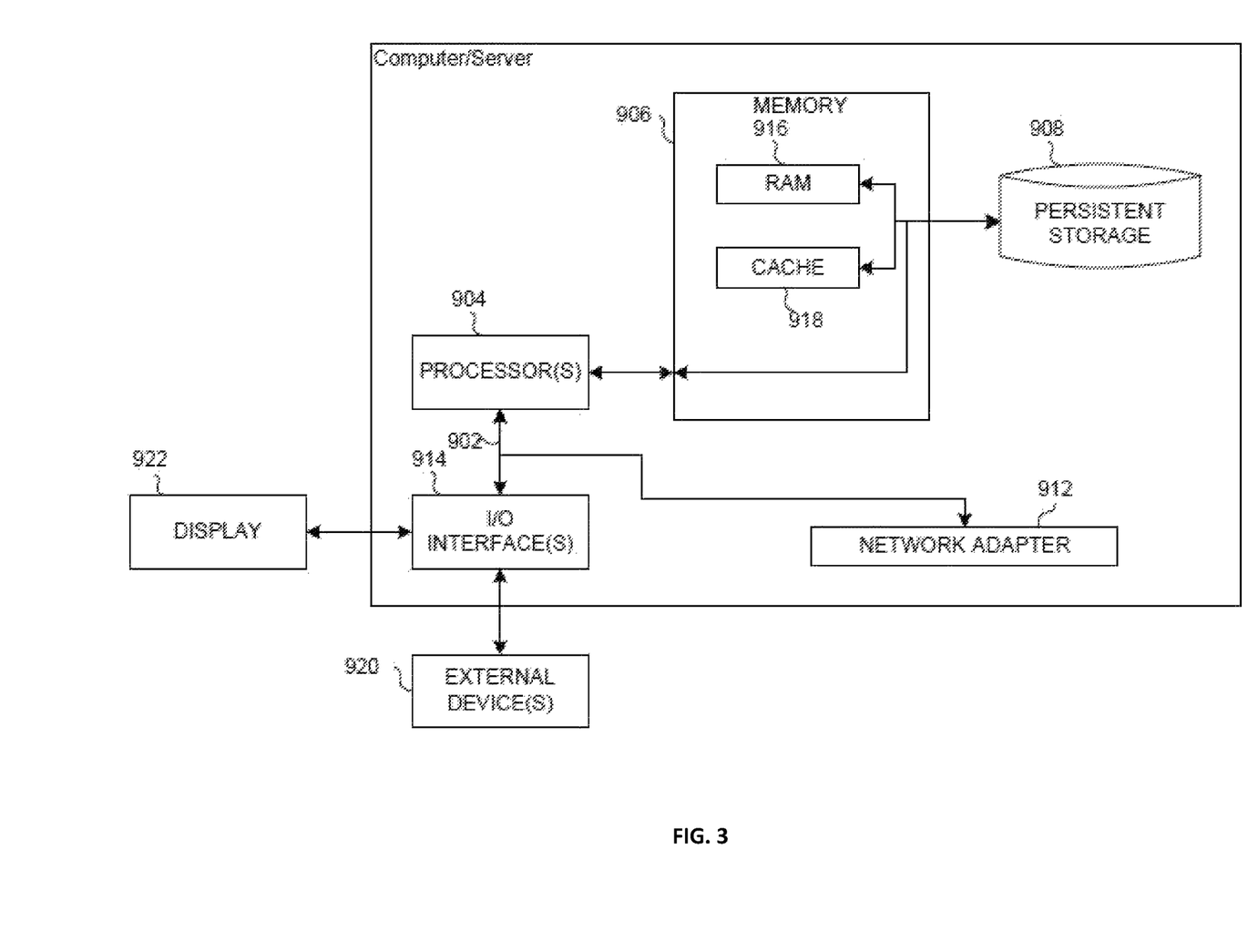
FIG. 3 is a block diagram depicting the hardware components of the predictive model management system of FIG. 1, in accordance with an embodiment of the invention.

FIG. 3 depicts a block diagram of components of model repository 120, message hub 130, analytic server 140, and predictive model evaluator 150, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Model repository 120, message hub 130, analytic server 140, and predictive model evaluator 150 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs analytic engine 142 and analytics collector 144 in analytic server 140; and analytics subscriber 152 and accuracy analyzer 154 in predictive model evaluator 150 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs analytic engine 142 and analytics collector 144 in analytic server 140; and analytics subscriber 152 and accuracy analyzer 154 in predictive model evaluator 150 may be downloaded to persistent storage 908 through network adapter 912.

I/O interface(s) 914 allows for input and output of data with other devices that may be connected to model repository 120, message hub 130, analytic server 140, and predictive model evaluator 150. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs analytic engine 142 and analytics collector 144 in analytic server 140; and analytics subscriber 152 and accuracy analyzer 154 in predictive model evaluator 150, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
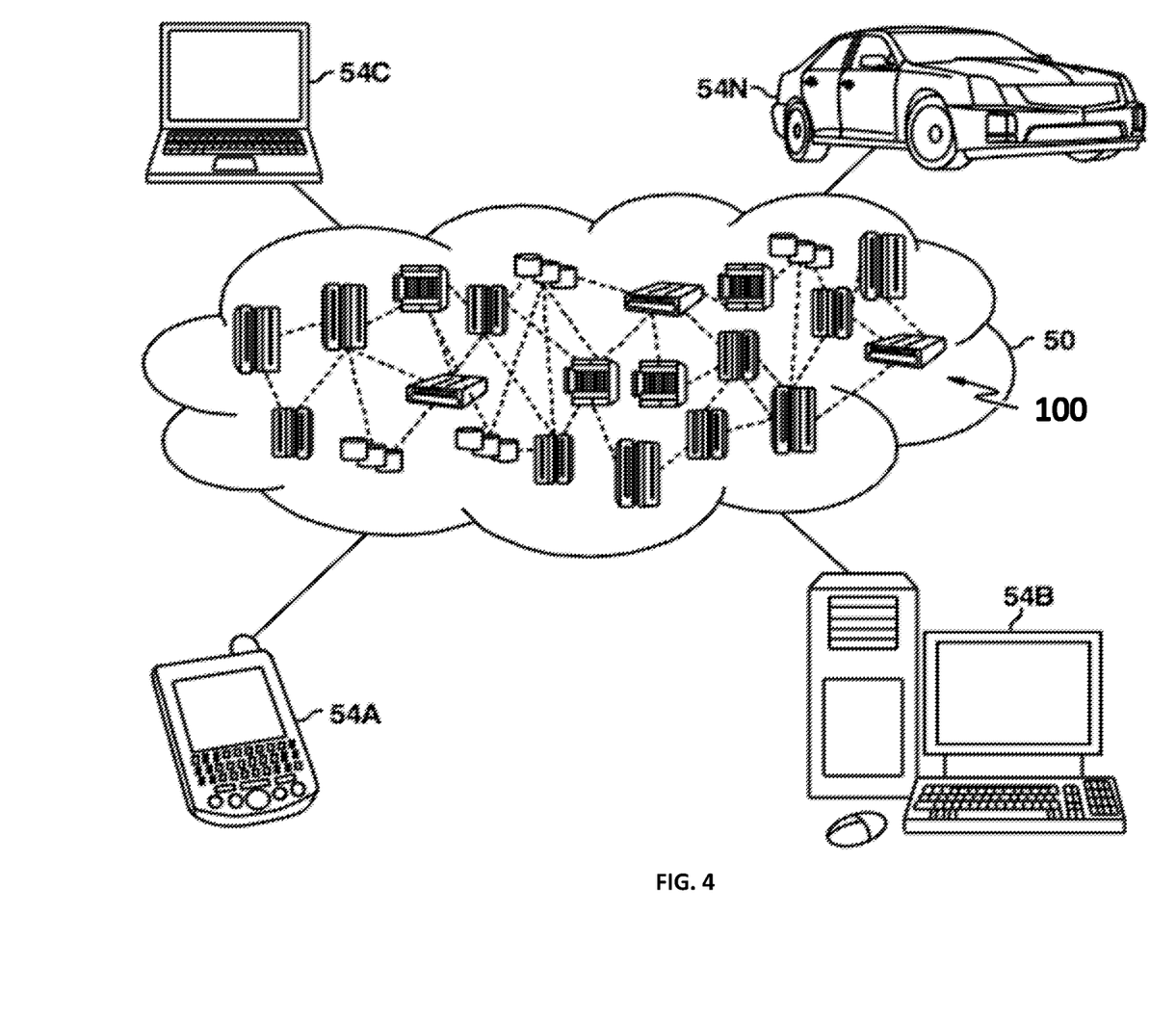
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
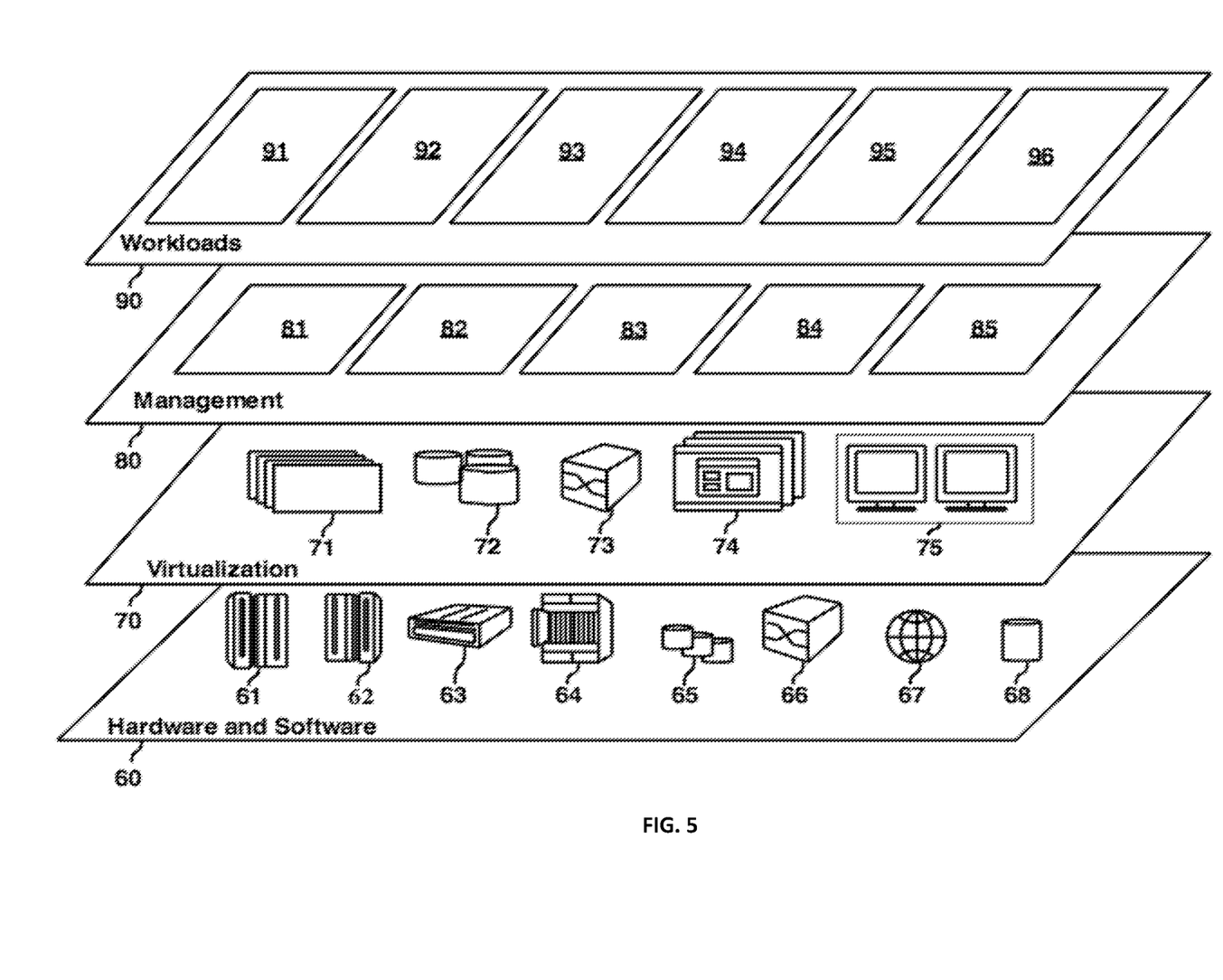
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive model management system 96. Predictive model management system 96 may relate to evaluating the accuracy of a deployed predictive model and updating the deployed predictive if necessary.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for managing data, the method comprising:
accumulating a plurality of predicted outputs according to a data accumulation rule, wherein the plurality of predicted outputs is generated by a predictive model executed by a first system, and wherein the predictive model is loaded, from a predictive model store, on to the first system, and wherein the data accumulation rule comprises accumulating the plurality of predicted outputs according to a predefined period of time;
evaluating, by a second system, an accuracy of the predictive model, wherein evaluating the accuracy of the predictive model comprises determining a degree of difference between the plurality of predicted outputs and information generated during a development stage of the predictive model;
in response to the determined degree of difference, determining whether the accuracy of the predictive model has declined by an amount which exceeds a pre-determined threshold value; and
based on determining that the accuracy of the predictive model has declined by an amount which exceeds a pre-determined threshold value, updating the predictive model.

2. The method of claim 1, wherein accumulating the plurality of predicted outputs comprises:
registering, by the second system, with a message hub, wherein the message hub is implemented by a third system, and wherein the message hub hosts the plurality of predicted outputs generated by the predictive model; and
retrieving, by the second system, the plurality of predicted outputs.

3. The method of claim 2, wherein the plurality of predicted outputs is published, by the first system, to the message hub.

4. The method of claim 1, wherein the second system is allocated in response to loading the predictive model on the first system.

5. The method of claim 1, wherein determining the degree of difference comprises:
retrieving, from the predictive model store, the information generated during the development stage of the predictive model;
comparing the accumulated plurality of predicted outputs to the retrieved information generated during the development stage of the predictive model; and
determining, using hypothesis testing techniques, whether the accumulated plurality of predicted outputs is different from the information generated during the development stage of the predictive model, based on a comparison of the accumulated plurality of predicted outputs and a plurality of initial training data for the predictive model.

6. The method of claim 1, wherein the accuracy of the predictive model is inversely related to the degree of difference.

7. A computer system for managing data, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
program instructions to accumulate a plurality of predicted outputs according to a data accumulation rule, wherein the plurality of predicted outputs is generated by a predictive model executed by a first system, and wherein the predictive model is loaded, from a predictive model store, on to the first system, and wherein the data accumulation rule comprises program instructions to accumulate the plurality of predicted outputs according to a predefined period of time;
program instructions to evaluate, by a second system, an accuracy of the predictive model, wherein evaluating the accuracy of the predictive model comprises determining a degree of difference between the plurality of predicted outputs and information generated during a development stage of the predictive model;
in response to the determined degree of difference, program instructions to determine whether the accuracy of the predictive model has declined by an amount which exceeds a pre-determined threshold value; and
based on determining that the accuracy of the predictive model has declined by an amount which exceeds a pre-determined threshold value, program instructions to update the predictive model.

8. The computer system of claim 7, wherein accumulating the plurality of predicted outputs comprises:
program instructions to register the second system with a message hub, wherein the message hub is implemented by a third system, and wherein the message hub hosts the plurality of predicted outputs generated by the predictive model; and
program instructions to retrieve, by the second system, the plurality of predicted outputs.

9. The computer system of claim 8, further comprising program instructions to publish, by the first system, the plurality of predicted outputs is published to the message hub.

10. The computer system of claim 7, wherein the second system is allocated in response to program instructions to load the predictive model on the first system.

11. The computer system of claim 7, wherein determining the degree of difference comprises:
program instructions to retrieve, from the predictive model store, the information generated during the development stage of the predictive model;

program instructions to compare the accumulated plurality of predicted outputs to the retrieved information generated during the development stage of the predictive model; and program instructions to determine, using hypothesis testing techniques, whether the accumulated plurality of predicted outputs is different from the information generated during the development stage of the predictive model, based on a comparison of the accumulated plurality of predicted outputs and a plurality of initial training data for the predictive model.

12. The computer system of claim 7, wherein the accuracy of the predictive model is inversely related to the degree of difference.

13. A computer program product for managing data, the computer program product comprising:

one or more computer-readable tangible storage medium and program instructions stored on at least one of the one or more tangible storage medium, the program instructions executable by a processor to cause the processor to perform a method comprising:

program instructions to accumulate a plurality of predicted outputs according to a data accumulation rule, wherein the plurality of predicted outputs is generated by a predictive model executed by a first system, and wherein the predictive model is loaded, from a predictive model store, on to the first system, and wherein the data accumulation rule comprises program instructions to accumulate the plurality of predicted outputs according to a predefined period of time;

program instructions to evaluate, by a second system, an accuracy of the predictive model, wherein evaluating the accuracy of the predictive model comprises determining a degree of difference between the plurality of predicted outputs and information generated during a development stage of the predictive model;

in response to the determined degree of difference, program instructions to determine whether the accuracy of the predictive model has declined by an amount which exceeds a pre-determined threshold value; and based on determining that the accuracy of the predictive model has declined by an amount which exceeds a pre-determined threshold value, program instructions to update the predictive model.

14. The computer program product of claim 13, wherein accumulating the plurality of predicted outputs comprises:

program instructions to register the second system with a message hub, wherein the message hub is implemented by a third system, and wherein the message hub hosts the plurality of predicted outputs generated by the predictive model; and program instructions to retrieve, by the second system, the plurality of predicted outputs.

15. The computer program product of claim 14, further comprising program instructions to publish, by the first system, the plurality of predicted outputs is published to the message hub.

16. The computer program product of claim 13, wherein the second system is allocated in response to program instructions to load the predictive model on the first system.

17. The computer program product of claim 13, wherein determining the degree of difference comprises:

program instructions to retrieve, from the predictive model store, the information generated during the development stage of the predictive model;

program instructions to compare the accumulated plurality of predicted outputs to the retrieved information generated during the development stage of the predictive model; and program instructions to determine, using hypothesis testing techniques, whether the accumulated plurality of predicted outputs is different from the information generated during the development stage of the predictive model, based on a comparison of the accumulated plurality of predicted outputs and a plurality of initial training data for the predictive model.

* * * * *